United States Patent [19]

Kumagai

[11] Patent Number: 5,249,136
[45] Date of Patent: Sep. 28, 1993

[54] SYSTEM FOR MEASURING FLUID-FLOW VELOCITY DISTRIBUTION

[75] Inventor: Ryohei Kumagai, Tokyo, Japan
[73] Assignee: Ezel, Inc., Tokyo, Japan
[21] Appl. No.: 944,734
[22] Filed: Sep. 14, 1992

Related U.S. Application Data

[63] Continuation of Ser. No. 620,078, Nov. 30, 1990, abandoned.

[30] Foreign Application Priority Data

Dec. 2, 1989 [JP] Japan ................................ 1-313911

[51] Int. Cl.⁵ ...................... G06F 15/64; G06F 15/66
[52] U.S. Cl. ................................... 364/510; 358/107; 358/139; 364/555; 364/565
[58] Field of Search ............... 364/509, 510, 555, 560, 364/561, 565; 358/105, 107, 139

[56] References Cited

U.S. PATENT DOCUMENTS

| | | | |
|---|---|---|---|
| 4,729,109 | 3/1988 | Adrian et al. | 364/560 |
| 4,785,402 | 11/1988 | Matsuo et al. | 364/413.07 |
| 4,837,708 | 6/1989 | Wright | 364/509 |
| 4,928,176 | 5/1990 | Schmidt et al. | 358/107 X |
| 4,947,247 | 8/1990 | Farver | 358/107 |
| 4,975,863 | 12/1990 | Sistler | 364/555 |
| 4,975,973 | 12/1990 | Kasano et al. | 358/107 X |

OTHER PUBLICATIONS

Lim et al., "Measurement and Moelling of Bubble Parameters in a Two-Dimensional Gas-Fluidized Bed Using Image Analysis," Powder Technology, 60 (1990) pp. 159-171, Jul. 1989.

*Primary Examiner*—Thomas G. Black
*Assistant Examiner*—Collin W. Park
*Attorney, Agent, or Firm*—Cushman, Darby & Cushman

[57] ABSTRACT

A system for determining a velocity of fluid flowing around an object generates a signal for an image of a fluid-flow surrounding the object. Based on the signal, the system determines a centroid for each particle in the fluid-flow, and calculates distances between centroids of two nearest particles. The system then determines a velocity distribution of the fluid-flow based on the distances.

1 Claim, 1 Drawing Sheet

SYSTEM FOR MEASURING FLUID-FLOW VELOCITY DISTRIBUTION

This is a continuation of application No. 07/620,078, filed on Nov. 30, 1990, which was abandoned upon the filing hereof Sep. 14, 1992.

BACKGROUND OF THE INVENTION

1. Field of the Invention

The present invention relates to a system for the measurement of the velocity of flow according to an image processing.

2. Description of the Preferred Embodiment

A spark tracing method is a measurement of velocity of a gas flow by discharging sparks at each predetermined period so as to photograph a "time string" represented by a "spark string" generated at each discharging. Visualization of a high speed gas flow is possible by heightening the frequency of a pulse voltage at a certain level. Also, photographing a spark string is easily performed since the spark string luminesces itself.

One problem is that the preparation of an expensive system is necessary due to the requirement of the powers of a high frequency and a high voltage for the tracing method of a spark. Furthermore, an accurate measurement of a flowing velocity inside of boundary layer is not possible due to the disturbance of gas caused by spark discharge.

SUMMARY OF THE INVENTION

The present invention solves the above-mentioned problems of the prior art and has an object to provide a simple system measuring the flowing velocity without disturbing a flow.

The flowing velocity measurement system according to the present invention comprises a means for photographing an image of fluids at the predetermined time intervals; a means for calculating a centroid of elements to be measured moving with fluid at each photograph of said photographing means; a means for calculating a distance between nearest centroids of elements in a composite image generated from two successive images photographed; and a means for calculating velocity of an element by dividing said distance between nearest centroid by said time interval.

When the shooting time interval is as short as possible, the distance between the nearest centroids of elements in a composite image generated from two successive images photographed can be determined as the moving distance of elements in a composite image generated from two successive images photographed.

The velocity of an element is calculated by dividing the above distance between nearest centroids by the above time interval. Also, it is possible to obtain a flowing velocity distribution of fluids by setting up elements to be measured.

DETAILED DESCRIPTION OF THE PREFERRED EMBODIMENT

Figure 2:
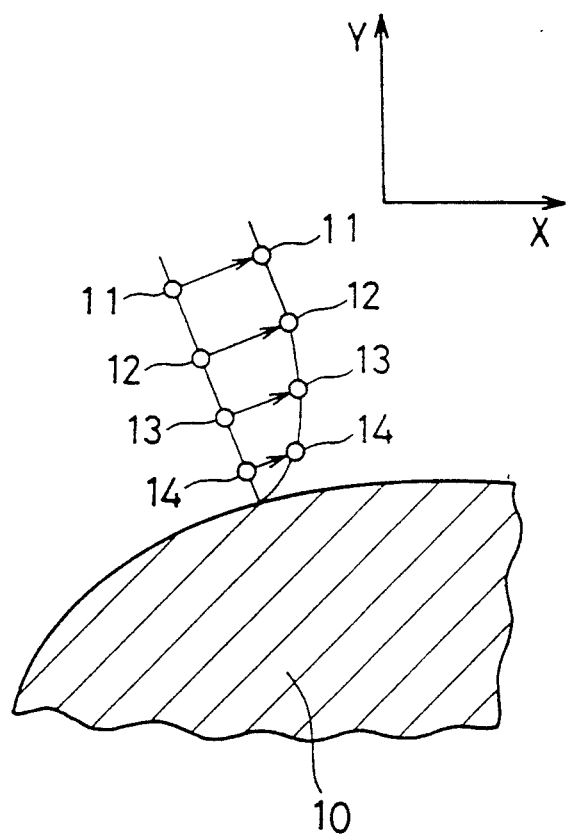
FIG. 2 shows a diagram showing of the movement of fluids around an object.

FIG. 2 shows an example of flowing velocity distribution of a gas around an object 10. Four particles 11 to 14 are shown as elements to be measured. Particles 11 to 14 align on a line perpendicular to the surface of the object 10 at a time (t) and as time passes they move (t+$\Delta$t). Here, it is shown that although particles 11 and 12 one far from the object 10 and move at the same the flowing velocity, flowing velocity of the particles slow down as they get close to the object 10 due to the viscosity of fluid. Therefore, the velocity of particle 14 is the slowest of all.

It is possible to calculate moving velocities of the particles so as to obtain a flowing velocity distribution by photographing the particles at every predetermined period of time ($\Delta$t) by a camera and dividing the moving distance for each particle by the above period of time ($\Delta$t).

Figure 1:
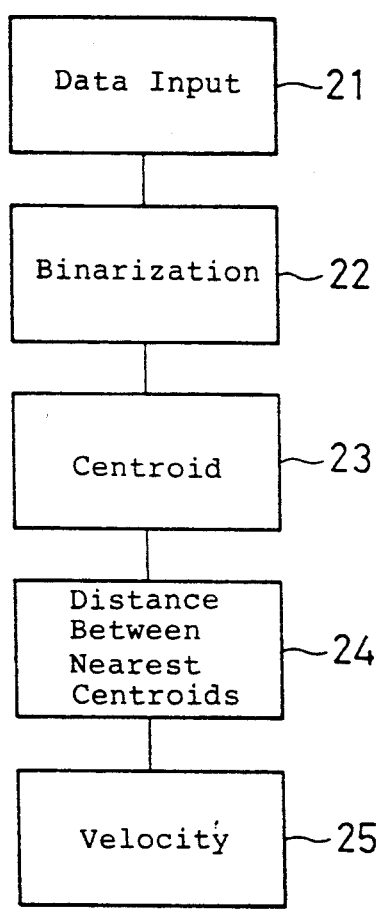
FIG. 1 shows a flow chart describing the procedure of a flowing velocity analysis according to an embodiment of the present invention.

FIG. 1 shows the procedure of a flowing velocity analysis performed by a flowing velocity measurement system.

A camera, which is not shown in the figure, takes a photograph of fluid around the object 10, for example, at every 1/30 second. The shooting time interval is set as short as possible, considering the distances among each particle, i.e. elements to be measured, and a flowing velocity. At step 21, an image data input from a camera is A/D converted and is input to a computer. This input data is a digital value and is binarized at step 22 by using the predetermined threshold. Here, particles 11 to 14 (FIG. 2) are determined to be "1" and other particles are determined to be "0". At step 23, the centroid of each particle is calculated by dividing the first moment of each particle by the area.

The locations of each particle in the fluid are registered in a memory of a computer at every 1/30 second. At step 24, the distance between nearest centroids of each particle obtained by photographing with respect to each particle is obtained by the previous photograph. Here, the distance between the nearest centroids indicate the shortest distance from a centroid of a configuration to the centroid of the other configurations. When one particle is taken into consideration, the location of the particle 1/30 second before is assumed to be the location corresponding to the distance between nearest centroids from the calculation of the distance between the nearest centroid of each particle on the present photograph.

At step 25, the velocity of each particle is calculated by dividing the distance between nearest centroids for each particle by 1/30 second, after calculating the location of each particle 1/30 second before. Accordingly the flowing velocity distribution is calculated.

According to the present embodiment as mentioned above, corpuscles are supplied into the fluids to be observed, and the flowing velocity is calculated by analyzing by means of a computer after obtaining the movement of the above particles as an image. Therefore, in the present flowing velocity measurement system, the powers of a high frequency and a high voltage (required by a tracing method of a spark) are not necessary, and the structure is simple. Also, a flowing velocity distribution is accurately measures since it does not disturb the fluids unlike the tracing method of a spark. Therefore, it is possible to obtain an accurate flowing velocity distribution of the boundary layer.

Hereinafter, an example of the calculation of the distance between nearest centroids is described.

As shown in FIG. 2, the origin of the coordinate axes is determined on the corner of upper left. Here, the downward direction is the y direction and the rightward direction is the x direction. Coordinates (x,y) of each particle are written in a table in a memory of a computer as follows.

TABLE

| | |
|---|---|
| $x_1$ | $y_1$ |
| $x_2$ | $y_2$ |
| $x_3$ | $y_3$ |
| . | . |
| . | . |
| . | . |
| $x_n$ | $y_n$ |

According to the above table, the y coordinate train is arranged so as to increase one-by-one, and the x coordinate train is arrange so as to increase one-by-one in each particle of the same y coordinate.

The distances between the nearest centroids can be defined for each particle, taking each particle as a reference particle one by one from which centroid distances to other particles can be calculated. The centroid distances are calculated sequentially between the reference particle and the other particles from the nearest to the remote one. "Nearest" means the order on the table is the nearest, therefore, as for the coordinate system above, centroid distance is calculated sequentially from the one whose value of y coordinate is the same as or the nearest to the centroid of the reference particle.

For example, when the particle whose centroid coordinate is ($x_k$, $y_k$) is the reference particle, the centroid distances to other particles are evaluated in increasing order or decreasing order. Here the increasing order is applied. First the centroid distance $d_{k, k+1}$ between the reference particle and the next particle is calculated as follows:

$$d_{k,k+1} = \{(x_k - x_{k+1})^2 + (y_k - y_{k+1})^2\}^{\frac{1}{2}} \quad (1)$$

Next the centroid coordinate ($x_{k+2}$, $y_{k+2}$) of next particle is evaluated and the value of the coordinates of $x_k$, $x_{k+1}$, $x_{k+2}$ are compared. Then, if the values are $$x_k \geq x_{k+1} \geq x_{k+2} \quad (2)$$

or $$x_k \leq x_{k+1} \leq x_{k+2} \quad (3)$$

the values of $d_{k, k-1}$ and $d_{k, k+2}$ are always $$d_{k,k+1} \leq d_{k,k+2}$$

Therefore the calculation of $d_{k, k+2}$ is omitted and the value of next group is evaluated. By omitting complex calculations as many times as possible, the process becomes efficient.

If the condition of (2), (3) or both are not satisfied, $d_{k, k+2}$ is calculated and the smaller one between $d_{k, k-1}$ and $d_{k, k+2}$ is registered. Thereafter ($x_{k+2}$, $y_{k+3}$), ($x_{k+4}$, $y_{k+4}$), . . . , are evaluated in the same manner as the above; that is, evaluation by conditions (2) and (3) and minimal times distance calculations are performed; finally the minimal value of distance is registered.

After the evaluation in increasing order, the evaluation in decreasing order is performed. As for the evaluation in decreasing order, the condition formulas (4) and (5) are applied instead of the above conditions (2) and (3).

$$x_k \leq x_{k-1} \leq x_{k-2} \quad (5)$$

$$x_k \geq x_{k-1} \geq x_{k-2} \quad (4)$$

When the evaluation in decreasing order is started, the minimum distance (hereinafter it is called $d_{u, min}$) obtained by the evaluation in increasing order is used as a reference distance. When a distance $d_{k, k+1}$ is $$d_{k,k-1} \geq d_{u,min}$$

the particles which do not satisfy the conditions (4) or (5) are evaluated by comparing their distances with $d_{u, min}$, then, the minimal distance is finally registered and the following evaluation is performed.

According to the above, the distance between nearest centroids for each particle are calculated. In this case, the evaluations are performed from increasing order to decreasing order, however the same result will be obtained by the evaluation in reverse sequences.

According to the present invention as mentioned above, it is possible to measure an accurate flowing velocity without disturbing a flow with a simple system.

What is claimed is:

1. A system for determining the velocity of fluid flowing around an object comprising:
   input means for generating a signal relating to an image of a fluid-flow surrounding an object, said signal being created at predetermined time intervals, said fluid-flow including particles;
   means for converting said signal into a digital signal and analyzing said digital signal to determine a centroid for each of said particles in said fluid-flow;
   means for calculating distances between said centroids of the two nearest particles in composite images generated from successive pairs of images; and
   means for generating a signal relating to a velocity distribution of said fluid-flow by dividing said distances by said predetermined time interval.

* * * * *